(12) United States Patent
Yamada et al.

(10) Patent No.: US 6,298,032 B1
(45) Date of Patent: Oct. 2, 2001

(54) CLAMPING DEVICE

(75) Inventors: Yoshinori Yamada; Koji Asao; Takashi Komiyama; Yasuhiro Shinkai, all of Saitama (JP)

(73) Assignee: Pioneer Corporation, Tokyo (JP)

( * ) Notice: Subject to any disclaimer, the term of this patent is extended or adjusted under 35 U.S.C. 154(b) by 0 days.

(21) Appl. No.: 09/453,917

(22) Filed: Apr. 27, 2000

(30) Foreign Application Priority Data

Apr. 27, 1999 (JP) .................................................. 11-118990

(51) Int. Cl.⁷ .......................... G11B 25/04; G11B 17/028
(52) U.S. Cl. ............................................. 369/270; 369/271
(58) Field of Search .................................... 369/264–271

(56) References Cited

U.S. PATENT DOCUMENTS

| | | | |
|---|---|---|---|
| 3,561,768 | * | 2/1971 | Castagna ................................ 369/266 |
| 4,079,946 | * | 3/1978 | Hara et al. ............................. 369/271 |
| 4,334,302 | * | 6/1982 | Peppers ................................. 369/261 |
| 4,841,516 | * | 6/1989 | Ohmori et al. ....................... 369/264 |

FOREIGN PATENT DOCUMENTS

| | | | |
|---|---|---|---|
| 0 872 846 A1 | * | 10/1998 | (EP) . |
| 54-085705 | * | 7/1979 | (JP) . |
| 58-211303 | * | 12/1983 | (JP) . |

* cited by examiner

Primary Examiner—William Klimowicz
(74) Attorney, Agent, or Firm—Sughrue, Mion, Zinn, Macpeak & Seas, PLLC (57) ABSTRACT

A clamping device consists of a disk table for setting thereon a disk-like recording medium bearing recorded information, and a clamper which cooperates with the disk table to hold the recording medium therebetween. At least one of the disk table and the damper is formed of polypropylene at where to contact with the recording medium. If a special disk, which has a high-temperature softening film on its label surface, is clamped under high temperature conditions for a long time, and the film softens and thereafter re-solidifies as the temperature lowers, a smooth release of the recording medium is attained.

22 Claims, 5 Drawing Sheets

CLAMPING DEVICE

CROSS-REFERENCE TO RELATED APPLICATIONS

Not Applicable

STATEMENT REGARDING FEDERALLY SPONSORED RESEARCH

Not Applicable

REFERENCE TO A MICROFICHE APPENDIX

Not Applicable

BACKGROUND OF THE INVENTION
DESCRIPTION OF THE RELATED ART

Figure 3:
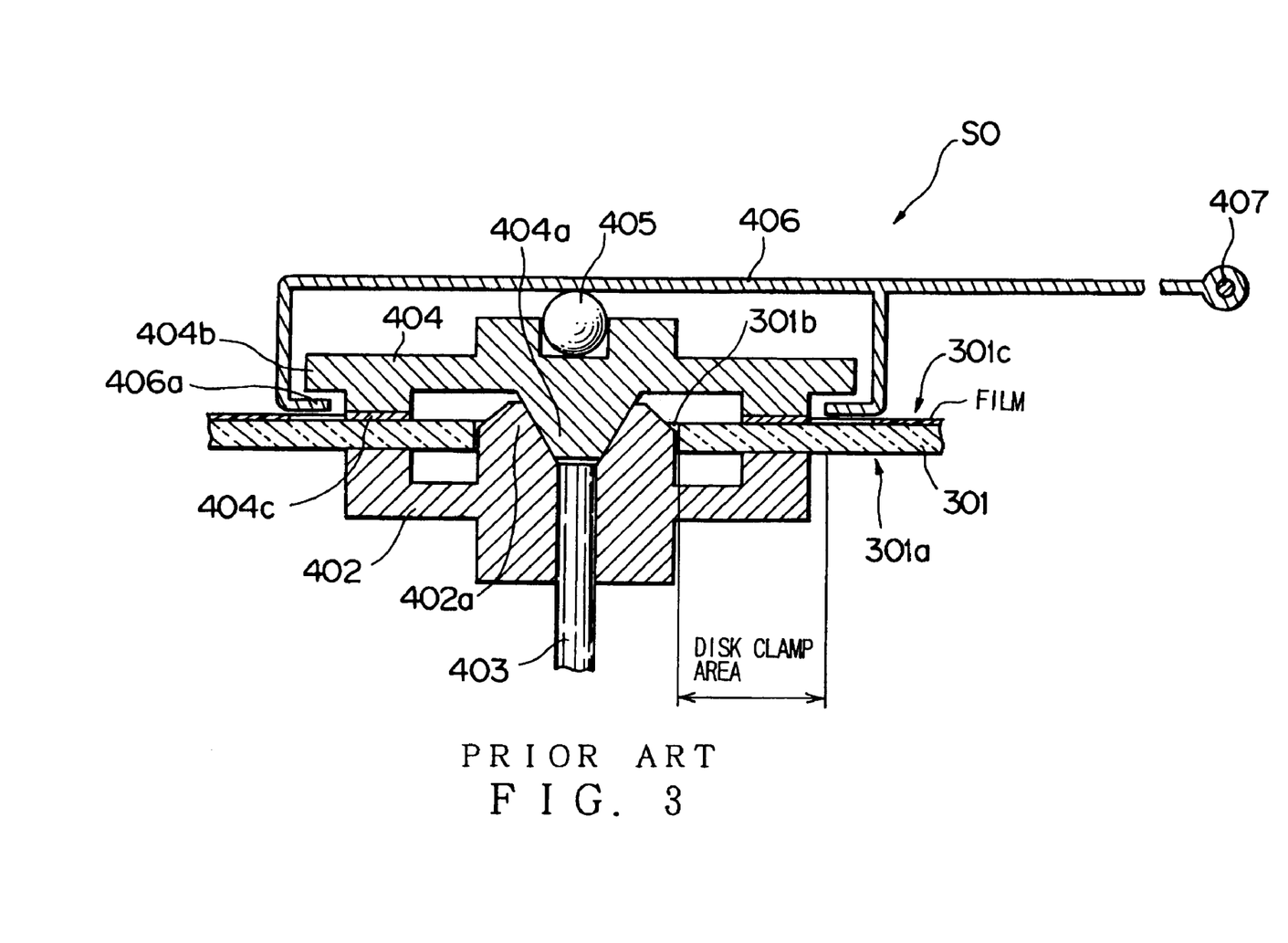
FIG. 3 is a partial schematic section of a conventional clamping device.

A conventional clamping device of this type is shown in FIG. 3. FIG. 3 is a partial schematic section of a conventional clamping device S0, with a compact disk shown in clamped condition. Denoted 301 in FIG. 3 is a so-called music reproducing compact disk.

The compact disk 301 is an optical disk with information recorded on one surface thereof, which is basically formed of a resin of good optical transmission such as polycarbonate. The one surface constitutes an information-bearing surface 301a, and the other surface constitutes a label surface 301c. The information-bearing surface 301a has thereon an information-bearing area extending radially from a predetermined inner to outer diameters, in which are recorded information by means of spirally arranged rows of pits.

The label surface 301c has thereon an area in which is coated and formed a film of printing paint (ink) of thermoplastic resin and the like, the area extending radially from a predetermined inner and outer diameters.

Denoted 301b is a center hole having a predetermined inner diameter. The area at an inner radius side around the center hole 301b, on each surface forms a disk clamp area. In the compact disk 301 as shown in this figure, the disk clamp area is located on the inner radius side of the information-bearing area on the information-bearing surface 301a and of the film-coated area on the label surface 301c. The clamping device S0 clamps the compact disk 301 at the disk clamp areas.

On a disk table 402 is placed the information-bearing surface 301a side of the compact disk 301. The disk table 402, in order to level the compact disk 301, is required to have a high flatness at the placement surface and is normally formed of metal such as iron, aluminum or the like, or rigid resin such as a composite resin of polycarbonate with glass fibers, ABS or the like, or a combination thereof.

The disk table 402 has an outer diameter slightly smaller than the inner diameter of the information-bearing area on the information-bearing surface 301a and is provided at its center with a truncated cone projection 402a for engaging in the center hole 301b and positioning the compact disk 301. The disk table 402 is secured to and rotates with a rotating shaft 403 of a motor mounted on a not-shown fixed chassis of the disk clamping device S0.

Denoted 404 is a clamper for pressing the compact disk 301 against the disk table 402, which is formed of metal such as iron, aluminum or the like, resin, or a combination thereof. The clamper 404 is applied, on a surface thereof opposed to the label surface 301c of the compact disk 301, with a damper sheet 404c.

The clamper sheet 404c is ring-shaped, is made of non-woven fabric of synthetic fibers, nylon fibers or polyester fibers, prevents the label surface 301c of the compact disk 301 from getting directly scratched by the clamper 404 and damaged when the compact disk 301 is moved to a predetermined clamping position, and increases the static friction of the clamper 404 on the compact disk 301 to prevent accidental slipping of the damper on the compact disk.

In FIG. 3, the clamper sheet 404c faces the label surface 301c in the disk clamp area.

The clamper 404 has a rigid steel ball 405 rotatably held at a center of its upper surface, an inverted truncated cone projection 404a on its lower surface which engages in an inverted truncated cone cavity formed at a center of the truncated cone projection 402a, and a circumferential flange 404b.

Denoted 406 is a clamper holder which is rotatably pivoted at one end, via a pin 407, to the fixed chassis of the clamping device S0. The clamper holder 406 is formed at the other end with a hook 406a engageable with the flange 404b.

It is arranged that the clamper holder 406 is rotatable, by means of a not-shown mechanism of the related disk player (not shown), about the pin 407 between the position in FIG. 3 (clamping position) and a later-described position in FIG. 4 (clamp-released position). The clamping operation of the compact disk 301 by the clamper 404 is effected through the movement of the clamper holder 406.

With the clamping device S0, to reproduce the compact disk 301, the clamper holder 406 is rotated by the not-shown mechanism of the disk player to the position in FIG. 3 to press, via the steel ball 405, on the clamper 404 with a predetermined stress, so that the clamper 404 cooperates with the disk table 402 to pressingly hold the compact disk 301 therebetween.

At this time, the clamper sheet 404c and the disk placement surface of the disk table 402 come into contact with the compact disk 301 at the disk clamp area of the latter. Further, at this time, the hook 406a is located spaced from the flange 404b. The clamping device S0 is thus in the position of clamping the compact disk 301.

In this condition, if the disk table 402 is powered by the motor to rotate at a predetermined linear velocity, the clamper 404 rotates with the compact disk 301. In this instance, because of its pressing through the clamper sheet 404c on the compact disk 301, the clamper 404 does not slip on the compact disk 301 and integrally rotates with the disk table 402 and the compact disk 301.

A not-shown pick-up of the disk player may now read recorded information at a predetermined linear velocity from the information-bearing surface 301 a of the compact disk 301.

Figure 4:
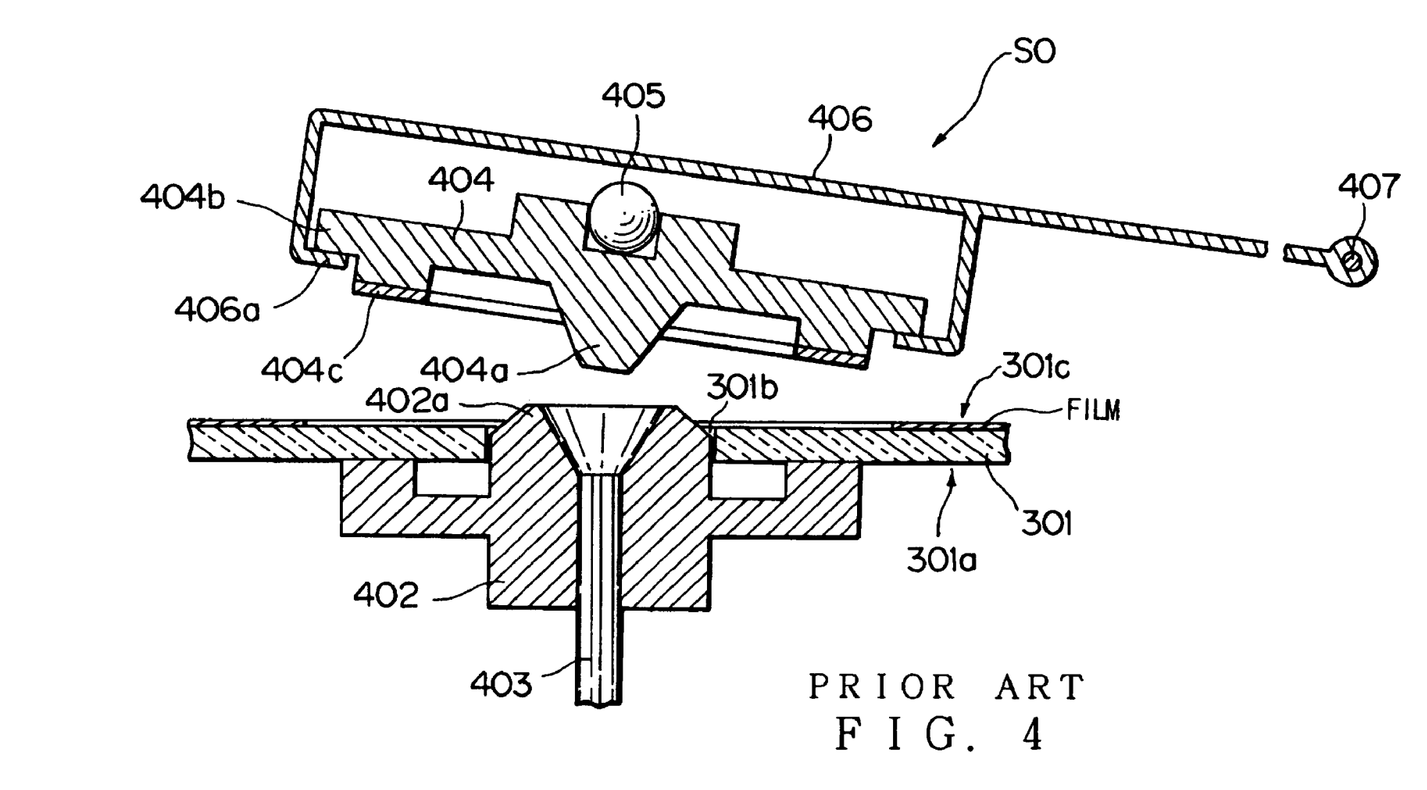
FIG. 4 is a view similar to FIG. 3, showing the conventional clamping device in the position of having released a compact disk.

FIG. 4 shows the clamping device S0 in position having released the compact disk 301. With the clamping device S0, to unclamp the compact disk 301 as shown in FIG. 4 from the clamped condition in FIG. 3, the clamper holder 406 is rotated to bring the hook 406a into engagement with the flange 404b and move the clamper 404 off the compact disk 301 to the position in FIG. 4. The compact disk 301 is thus released from the pressing by the clamper 404 and unclamped.

In recent years, a compact disk player has been widely used not only at home, but also for portable and in-car purposes, with the result that a clamping device used with the player is also used under various severe conditions.

Where used in car, for example, it is possible that the temperature inside a car cabin exceeds 80° C. on a mid summer day, and that a compact disk 301 is left in clamped condition by a clamping device for a long time under such conditions.

In ordinary cases, with consideration given to such a use environment, a printing paint (ink) such as will not soften even at elevated temperatures is used for forming a film of paint on a label surface 301c of the compact disk 301.

It has recently been recognized, however, that there exists a disk which uses a printing paint (ink) such as will soften under the above-mentioned high temperature conditions (hereinafter referred to as special disk).

Figure 5:
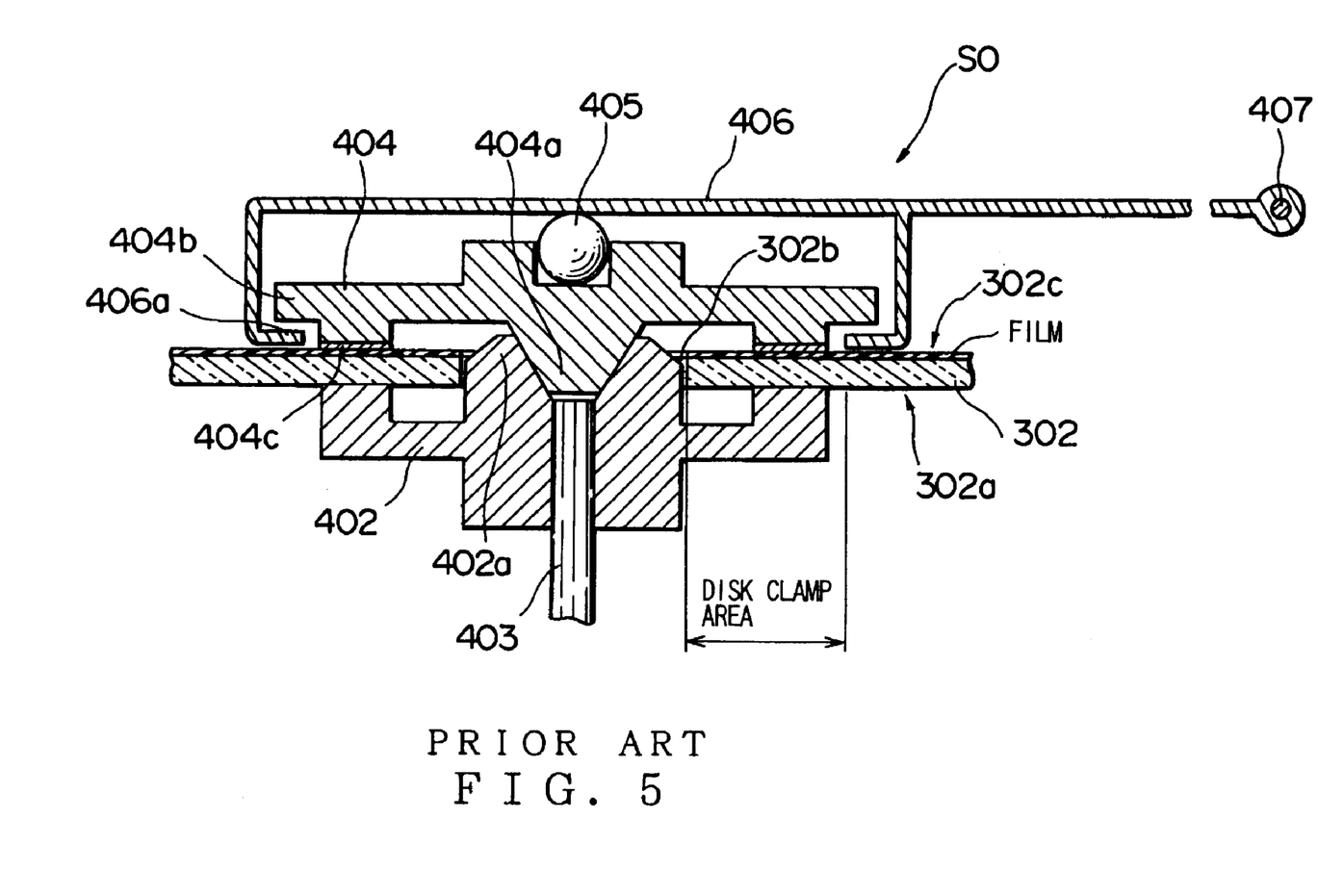
FIG. 5 is a view similar to FIG. 3, with a film of printing paint (ink) covering a disk clamp area on the conventional clamping device.

With a special disk 302 of this type, if it has a film of printing paint formed at its disk clamp area as shown in FIG. 5, clamping the special disk 302 will be accompanied with the following problems.

If, for example. the special disk 302 is left clamped by the clamping device S0 in high temperature conditions, the film on the label surface 302c of the special disk 302 will soften, so that the softened film especially at where held by the clamping device S0 (at where in contact with the clamper sheet 404c) penetrates in between fibers of the clamper sheet 404c during the clamping.

The above has been ascertained by an experiment in which the special disk 302 is left clamped by the clamping device S0 for 24 hours in a 50° C. environment.

The thus softened film, with the temperature restoring to room temperature, resolidifies as-is, with the result that portion of the special disk 302 in contact with the clamper sheet 404c adheres to the latter, thereby causing a problem of unsmoothed release of the clamping.

FIELD OF THE INVENTION

This invention relates to a clamping device for holding in a rotating manner a disklike recording medium such as an optical disk, magnetic disk or the like.

SUMMARY OF THE INVENTION

This invention has been accomplished to overcome the above drawbacks and an object of this invention is to provide a clamping device which enables a special disk with a high-temperature softening film formed on its label surface to be easily released from clamping, if the special disk has been clamped for a long time under high temperature conditions and the printed film on its label surface has softened and thereafter resolidified as the temperature lowers.

In order to attain the object, according to this invention, there is provided a clamping device which comprises: a disk table for setting thereon a disk-like recording medium bearing recorded information; and a clamper which cooperates with the disk table to hold the recording medium therebetween, wherein at least one of the disk table and the clamper is formed of polypropylene at where to contact with the recording medium.

In the clamping device of the above construction, the recording medium is held between the disk table and the clamper, one or both of which are formed of polypropylene at where to contact with the disk. Accordingly, if for example the disk is kept clamped in a high temperature environment of about 85° C. for a long time of about 96 hours and the printing paint (ink) film on the label surface of the recording medium softens and thereafter re-solidifies as the temperature decreases, the disk table and the clamper reject the ink at where to contact with the recording medium, thereby to attain a smooth release of the recording medium from the clamping device.

Preferably, the clamper is formed of polypropylene at where to contact with the recording medium.

Preferably, the clamper comprises a disk-like base portion and a ring-shaped portion formed circumferentially around the base portion, and the ring-shaped portion is formed of polypropylene to contact with the recording medium.

Advantageously, the ring-shaped portion is separate from and integrally fitted to the disk-like base portion.

Advantageously, the disk-like base portion and the ring-shaped portion are provided in one piece, formed of polypropylene.

Preferably, the disk table and the clamper hold the recording medium therebetween at respective portions thereof located at the same distance from a center of the disk table and the clamper.

Advantageously, the disk table and the clamper hold the recording medium therebetween at respective portions thereof located at different distances from a center of the disk table and the clamper.

The above and other objects, features and advantages of this invention will become apparent from the following description and the appended claims, taken in conjunction with the accompanying drawings.

DESCRIPTION OF THE PREFERRED EMBODIMENTS

Preferred embodiments of this invention will now be described with reference to the attached drawings.

Figure 1:
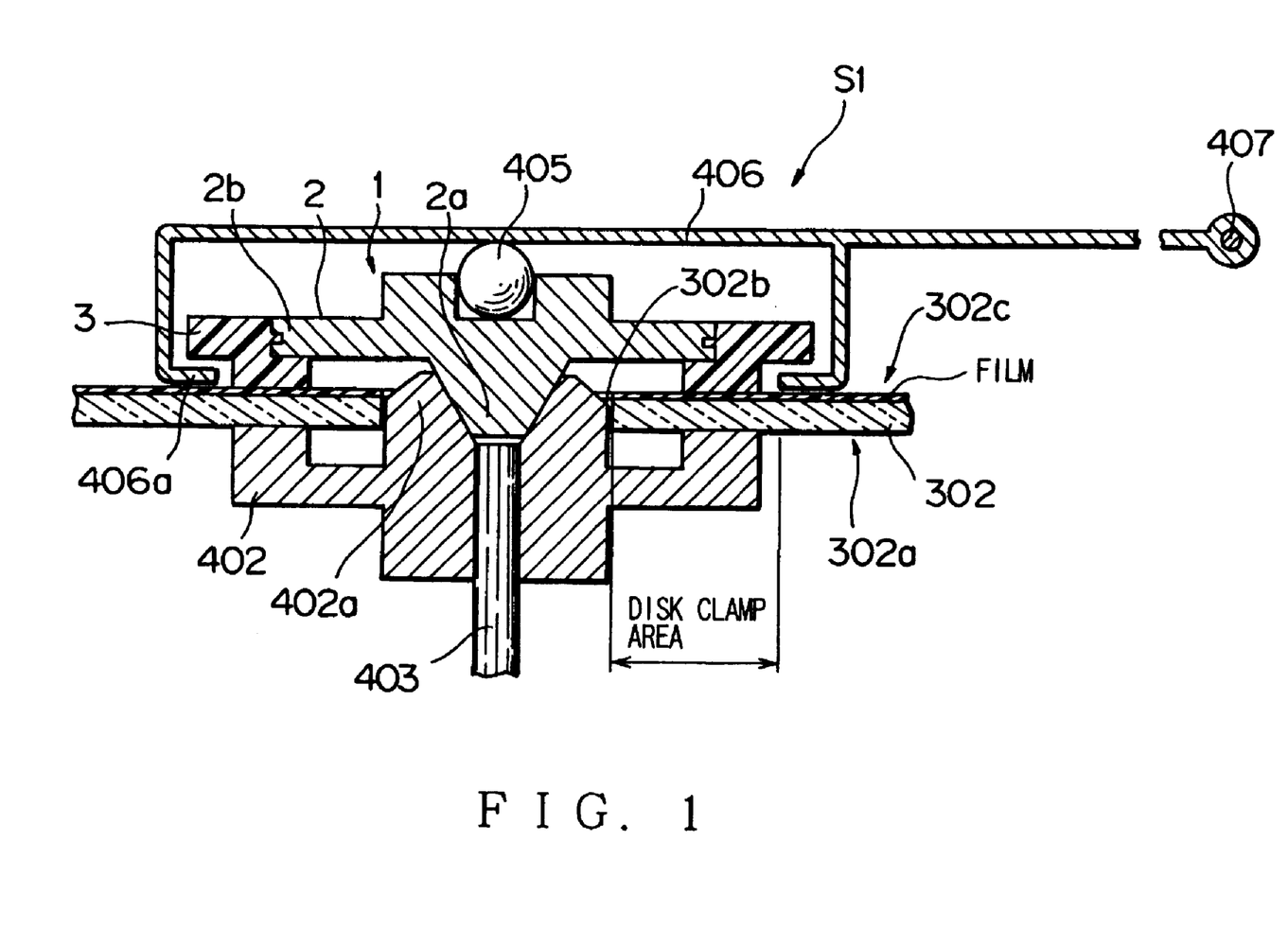
FIG. 1 is a partial schematic section of a clamping device according to a first embodiment of this invention.

Referring to FIG. 1, a compact disk 302 is shown clamped, which has its entire label surface 302c covered with a film. Incidentally, in a clamping device S1 in FIG. 1, constituent elements identical with those of the conventional clamping device previously described in connection with FIGS. 3 to 5 are given like reference characters and their description will be omitted to avoid redundancy.

In FIG. 1, the clamping device S1 includes a disk table 402 fixed to a rotating shaft 403 of a motor and a clamper 1. The clamper 1 is made up of a disk-like base portion 2 made of metal such as iron, aluminum or the like, resin or a combination thereof and a ring-shaped contact portion 3 of polypropylene integrally formed around the base portion. The polypropylene-made contact portion 3 features this invention and serves a later-described operation.

Polypropylene has a high chemical resistance to acid, alkali, organic solvent and the like and is widely known as a chemically stable general-purpose resin. The base portion 2 is generally of disk-like shape, and has a steel ball 405 rotatably held at a center on its upper surface and an inverted truncated cone projection 2a on its lower surface which engages in an inverted truncated cone cavity formed at a center of a truncated cone projection 402a formed on the disk table 402. The base portion 2 has a flange 2b formed circumferentially therearound. In the present embodiment, the clamper 1 is formed with the flange 2b of the base portion 2 fitted to the contact portion 3 through insert molding.

The contact portion 3 is secured at a lower surface side of the base portion 2 so that its flat bottom surface may face the label surface 302c at inside the disk clamp area.

A clamper holder 406 is rotatably pivoted at one end, via a pin 407, to a fixed chassis of the disk clamping device S1 and is formed at the other end with a hook 406a engageable with the flange 2b. The clamper holder 406 is rotated by means of a not-shown mechanism of the related disk player (not shown) so as to cause the clamper 1 to clamp the special disk 302.

With the clamping device S1, to reproduce the special disk 302, the clamper holder 406 is rotated by the not-shown mechanism of the disk player to the closed position in FIG. 1 to press, via the steel ball 405, on the clamper 1 with a predetermined stress, so that the clamper 1 cooperates with the disk table 402 to pressingly hold the special disk 302 therebetween. At this time, the bottom surface of the clamper contact portion 3 and the disk placement surface of the disk table 402 come into contact with the special disk 302 at the disk clamp area of the latter. Further, at this time, the hook 406a is located spaced from the flange 2b.

The clamping device S1 is thus in the position of clamping the special disk 302 as shown in FIG. 1.

With the clamping device S1, to unclamp the special disk 302 from the clamped condition in FIG. 1, the clamper holder 406 is rotated to bring the hook 406a into engagement with the flange 2b and move the clamper 1 off the special disk 302. The special disk 302 is thus released from the pressing by the clamper 1 and unclamped.

As described above, in the present embodiment, the formation of the contact portion 3 of the clamper 1 from polypropylene features this invention.

While in the first embodiment the contact portion 3 of the clamper 1 is shown to have its bottom surface pressing on the label surface 302c of the special disk 302 at the disk clamp area, the arrangement is not limited to such. In other words, as is the case with a clamper 4 employed in a clamping device S2 shown in FIG. 2, it may be arranged that the contact portion presses on the label surface 302c of the special disk 302 at outside the disk clamp area.

Figure 2:
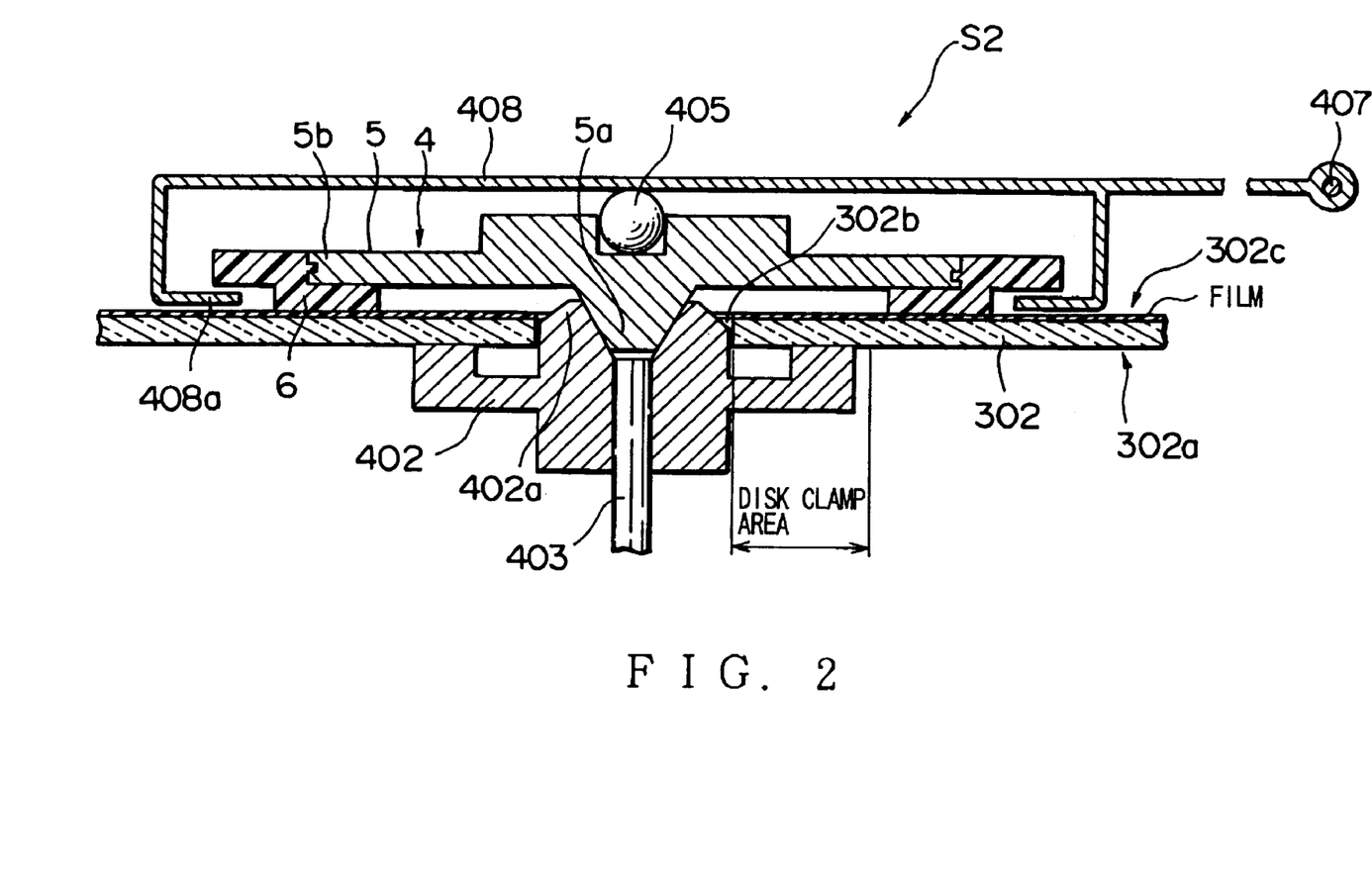
FIG. 2 is a partial schematic section of a variant example of the clamping device of FIG. 1.

FIG. 2 is a partial schematic section of a clamping device S2, a variant of the clamping device of FIG. 1, with a special disk 302 clamped.

The clamping device S2 includes a clamper 4 and a clamper holder 408 in place of the clamper 1 and the clamper holder 406 of the clamping device S1, respectively. In this embodiment, the clamper 4 is formed, with a flange 5b of a base portion 5 fitted to a contact portion 6 through insert molding.

In the present embodiment, the bottom surface of the clamper contact portion 6 presses on the film on the label surface 302c of the special disk 302 at outside the disk clamp area, while the disk placement surface of the disk table 402 presses at inside the disk clamp area on the information-bearing surface 302a side, thereby to clamp the special disk 302. At this time, a hook 408a is spaced from the flange 5b.

The clamping device S2 is thus in the position of clamping the special disk 302.

In the present embodiment, the contact portion 6 of the clamper 4 is also formed of polypropylene.

Below are experiments conducted with the clamping device S1 incorporating the clamper 1 as in the first embodiment and with the clamping device S2 incorporating the clamper 4, the variant of that in the first embodiment.

EXAMPLE 1

The clamping device S1 with the special disk 302 clamped was left standing for 96 hours in an environment of 85° C. As a consequence of this, the film on the label surface 302c at where pressed with the bottom surface of the clamper contact portion 3 softened.

Thereafter, the environmental temperature was lowered to room temperature, with the special disk 302 kept clamped by the clamping device S1, and the clamper holder 406 was rotated to bring the hook 406a into engagement with the flange 2b and subsequently move the clamper 1 off the special disk 302.

In the above, the softened film on the label surface 301c of the special disk 302 kept clamped in the 85° C. environment lowers in temperature to room temperature and resolidifies. The solidified ink, however, did not adhere to the polypropylene-made contact portion 3 at the bottom surface nor circumferential edges of the latter. Polypropylene used for the contact portion 3 has thus proved to have a good surface releasability to the ink, printing paint, binder adhesive, spreading agent and the like contained in the film on the label surface.

Thus, it has been proved that the special disk clamped with the clamper 1 having the polypropylene-made contact portion 3 is easily releasable from the contact portion 3, with the re-solidified ink left at the disk clamp area on the special disk. The special disk was thus easily released from the clamper 1 to attain a smooth unclamping of the special disk.

EXAMPLE 2

The clamping device S2 with the special disk 302 clamped was left standing for 96 hours in an environment of 85°C. As a consequence of this, the film on the label surface 302c at where pressed with the bottom surface of the clamper contact portion 3 softened.

Thereafter, the environmental temperature was lowered to room temperature, with the special disk 302 kept clamped by the clamping device S2, and the clamper holder 408 was rotated to bring the hook 408a into engagement with the flange 5b and subsequently move the clamper 4 off the special disk 302.

In the above, the softened film on the label surface 302c of the special disk 302 kept clamped in the 85° C. environment lowers in temperature to room temperature and resolidifies. The solidified ink, however, did not adhere to the polypropylene-made contact portion 6 at the bottom surface nor circumferential edges of the latter. Polypropylene used for the contact portion 6 has thus proved to have a good surface releasability to the ink, printing paint, binder adhesive, spreading agent and the like contained in the film on the label surface.

Thus, it has been proved that the special disk 302 clamped with the clamper 4 having the polypropylene-made contact portion 6 is easily releasable from the contact portion 6, with the re-solidified ink left on the label surface 302c of the special disk 302. The special disk 302 was thus easily released from the clamper 4 to attain a smooth unclamping of the special disk.

As described above, the clamper 1 according to the first embodiment of this invention and its variant, clamper 4 have proved to realize a good result, if used with the special disk 302. Further, any malfunction has not been found if used with the normal disk 301.

While, in the clamping device S1 and its variant S2 in the described embodiments of this invention, the compact disk 302 is set with its information-bearing surface 302a side on the disk table 402, it is also possible to set with its label surface 302c side on the disk table 402. In the latter case, the disk table 402 is formed of polypropylene at least at where to contact with the compact disk 302. Further, both the disk table 402 and the clamper 1 or 4 may be formed of polypropylene at where to contact with the special disk 302, so that even in the case where, for example, the special disk 302 is set upside down, no rise is given to the problem as mentioned above.

While in the described embodiments of this invention it is arranged that the disk table 402 is powered by the motor to rotate, it is also possible that the clamper 1 or 4 is powered to rotate.

It is preferred that, as the polypropylene used forming the contact portions 3 and 6 in the described embodiments, polypropylene be used which is softer than the disk-making polycarbonate, so that the compact disk 301 or the special disk 302 does not take scratches at the surface.

Although in the described embodiments of this invention the clamper 1 or 4 is described as consisting of a disk-like base portion of metal and a ring-shaped contact portion of polypropylene integrally fitted around the base portion by insert molding, such should not be construed as restrictive. In other words, the clamper 1 or 4, inclusive of the base portion and the contact portion, may be integrally formed of polypropylene.

The clamper 1 or 4 may alternatively be formed by so-called two-color molding, in which the base portion is first molded of rigid resin inside a mold, followed by molding the contact portion of polypropylene to be integral with the base portion.

The clamper 1 or 4 may further be formed by integrally applying a ring-shaped contact portion of polypropylene sheet to the base portion of metal with an adhesive or the like.

Thus, as described above, because in the present invention the disk table and/or the clamer is formed of polypropylene at where to contact with a recording medium if for example the special disk is kept clamped in a high temperature environment of about 85° C. for a long time of about 96 hours and the film on the label surface of the recording medium softens and thereafter re-solifies as the temperature decreases, the disk table and/or the clamper rejects and is free of ink at portions at which to contact with the label surface of the recording medium.

Consequently, a smooth clamp release of the special disk is attained. Further, a favorable clamping operation is assured for a normal compact disk.

Having now fully described the invention, it will be apparent to one of ordinary skill in the art that many changes and modifications can be made thereto without departing from the spirit and scope of the invention as set forth herein.

What is claimed is:

1. A clamping device comprising:
    a disk table for setting thereon a disk-like recording medium, wherein an information surface of said recording medium bears recorded information and wherein said disk table supports said recording medium only at a portion of said information surface; and
    a clamper which cooperates with said disk table to hold said recording medium therebetween,
    wherein at least one of said disk table and said clamper is formed of polypropylene at where to contact with said recording medium, and
    wherein said clamper is formed of polypropylene at where to contact with said recording medium.

2. The clamping device according to claim 1, wherein said clamper comprises a disk-like base portion and a ring-shaped portion formed circumferentially around said base portion, and said ring-shaped portion is formed of polypropylene to contact with said recording medium.

3. The clamping device according to claim 2, wherein said ring-shaped portion is separate from and integrally fitted to said disk-like base portion.

4. The clamping device according to claim 2, wherein said disk-like base portion and said ring-shaped portion are provided in one piece, formed of polypropylene.

5. The clamping device according to claim 1, wherein said disk table and said clamper hold said recording medium therebetween at respective portions thereof located at the same distance from a center of said disk table and said clamper.

6. The clamping device according to claim 1, wherein said disk table and said clamper hold said recording medium therebetween at respective portions thereof located at different distances from a center of said disk table and said clamper.

7. An apparatus that clamps an information medium having a first surface and a second surface opposed to said first surface, wherein said first surface contains reproducible information and wherein said apparatus comprises:
    a disk table having a support portion that supports said an information medium at a first portion of said first surface such that a second portion of said first surface is exposed; and
    a clamper having a clamping portion that exerts a force on said second surface of said information medium such that said information medium is held between said clamper and said disk table,
    wherein at least one of said support portion and said clamping portion comprises polypropylene, and
    wherein said clamper is formed of polypropylene at where to contact with said information medium.

8. The apparatus as claimed in claim 7, further comprising:
    a reading device,
    wherein said information medium is substantially disk-shaped, and
    wherein said clamper and said disk table rotate around a central axis of said information medium to enable said reading device to read said information from said first surface of said information medium.

9. The apparatus as claimed in claim 7, wherein said clamper comprises a clamper holder that is operably coupled to said clamping portion,
    wherein said clamping portion exerts said force on said second surface of said information medium when said clamper holder is in a first position and does not exert a force on said second surface of said information medium when said clamper holder is in a second position.

10. The apparatus as claimed in claim 9, wherein said clamping portion and said disk table are rotatably disposed with respect to said clamper holder when said clamper holder is in said first position.

11. The apparatus as claimed in claim 9, further comprising:
   a pin,
   wherein said clamper holder moves between said first position and said second position by pivoting around said pin.

12. The apparatus as claimed in claim 11, wherein said clamping portion comprises a clamping portion flange and said clamper holder comprises a clamper holder flange, and
   wherein said clamper holder flange engages said clamping portion flange to move said clamping portion away from said second surface of said information medium when said clamper holder moves to said second position.

13. The apparatus as claimed in claim 7, wherein said clamping portion comprises polypropylene.

14. The apparatus as claimed in claim 13, wherein said clamper comprises a base portion coupled to said clamping portion and wherein said base portion does not comprise polypropylene.

15. The apparatus as claimed in claim 7, further comprising:
   a shaft coupled to at least one of said disk table and said clamper,
   wherein said disk table and said clamper rotate when said shaft rotates and when said information medium is held between said clamper and said disk table.

16. The apparatus as claimed in claim 7, wherein said clamping portion is ring-shaped.

17. The apparatus as claimed in claim 7, wherein said support portion is ring-shaped.

18. The apparatus as claimed in claim 17, wherein said clamping portion is ring-shaped, and
   wherein a distance between an outer circumference of said clamping portion and a center of said information medium is substantially equal to a distance between an outer circumference of said support portion and said center of said information medium.

19. The apparatus as claimed in claim 17, wherein said clamping portion is ring shaped, and
   wherein a distance between an outer circumference of said clamping portion and a center of said information medium is greater than a distance between an outer circumference of said support portion and said center of said information medium.

20. The apparatus as claimed in claim 7, wherein a distance between a remote point of said clamping portion and a center of said information medium is greater than a distance between a remote point of said support portion and said center of said information medium.

21. The apparatus as claimed in claim 7, wherein a distance between a remote point of said clamping portion and a center of said information medium is substantially equal to a distance between a remote point of said support portion and said center of said information medium.

22. An apparatus that clamps an information medium having a first surface and a second surface opposed to said first surface, wherein said first surface contains reproducible information and wherein said apparatus comprises:
   a disk table having a support portion that supports said information medium at a first portion of said first surface such that a second portion of said first surface is exposed; and
   a device having a clamping portion that exerts a force on said second surface of said information medium such that said information medium is held between said device and said disk table, and is able to be rotated by a motor,
   wherein at least one of said support portion and said clamping portion comprises polypropylene, and
   wherein said clamping portion is formed of polypropylene at where to contact with said information medium.

* * * * *